United States Patent [19]

Barbieri

[11] 3,800,070

[45] Mar. 26, 1974

[54] DEVICE FOR DETERMINING THE QUANTITIES OF COLORED PRINTING LIGHT FOR THE PHOTOGRAPHIC PRINTING OF COLOR TRANSPARENCIES

[75] Inventor: Siegfried Barbieri, Brixen, Italy

[73] Assignee: DURST A.G. Fabrik Fototechnischer Apparate, Bozen, Italy

[22] Filed: Sept. 8, 1971

[21] Appl. No.: 178,641

[30] Foreign Application Priority Data

Sept. 18, 1970 Italy .................................. 4872/70

[52] U.S. Cl. ................................ 178/5.2 A, 355/35

[51] Int. Cl. ............................................ H04n 9/02

[58] Field of Search ............ 178/5.4, 5.2 A; 355/35

[56] References Cited

UNITED STATES PATENTS 2,981,791 4/1961 Dixon ............................ 178/5.2 A 3,351,707 11/1967 Dreyfoos, Jr. et al. .......... 178/5.2 A 3,115,807 12/1963 Craig et al. ...................... 178/5.2 A 3,674,364 7/1972 Korman .......................... 178/5.2 A

*Primary Examiner*—Richard Murray

*Attorney, Agent, or Firm*—Connelly and Hutz

[57] ABSTRACT

A closed circuit television camera and monitor system, of the field sequential type, is connected to the photographic color printing apparatus for scanning the transparency illuminated by the printing light. The relative amounts of the three basic color components in the printing light are adjusted by inserting corresponding filters into the printing light until a satisfactory balance is obtained in the color image viewed on the monitor. The duration of the exposure is determined by varying the aperture of the television camera lens and therefore the brightness of the monitored image.

10 Claims, 2 Drawing Figures

DEVICE FOR DETERMINING THE QUANTITIES OF COLORED PRINTING LIGHT FOR THE PHOTOGRAPHIC PRINTING OF COLOR TRANSPARENCIES

BACKGROUND OF THE INVENTION

Various photoelectric light measuring devices have been used for determining the amounts of colored light required to print color transparencies including color negatives on photographic color printing paper. These devices measure the color content of either a portion or the overall transparency. The printing illumination is then conducted in reverse relationship to be measured color content with the amounts of the three basic color components being selected to provide a neutral gray for a test transparency or negative. Statistically considered, this provides primarily good results for printing transparencies of a variety of subjects and color content, but this so-called neutral gray compensation cannot provide exact results in all cases because the color measuring system cannot differentiate between transparencies which have been exposed at noon and at sundown. These measuring devices also cannot take human preferences into consideration. In practice, this neutral gray printing system yields satisfactory results in about 60 to 70 percent of amateur photography work. The more precise fashion and industrial photographers, however, only utilize the neutral gray factors only for printing a preliminary test copy, which is then employed to determine the ultimate printing light factors.

A video color analyzer has recently been successfully used for more precise color printing requirements, wherein the color transparency is linearly scanned with sharply focused video camera tube to positively produce an image of the transparency to be printed on the picture screen of the color television monitor. The three color components viewed in the video analyzer are adjusted by calibrated controls until the picture is satisfactory to the viewers perferences both in color and in intensity. This permits subjective determination of the color components for the ultimate image. The adjusted printing exposure factors are read from the calibrated controls and transferred to the copying apparatus to guide the ultimate printing exposure. The video color analyzer provides results comparable to those achieved with the photometric method of printing the results of amateur photography. The reasons why the analyzer does not provide a 100 percent satisfactory output even for perfect transparencies are as follows:

1. Two basically different light sources are used for scanning and copying. The errors resulting from the instability of each of the light sources may accummulate to a relatively great magnitude.

2. The optical components disposed in the different paths of light include filters, condensors and reflectors having properties which may diverge in response to exposure to heat and moisture. In particular, the spectral transparency of filters is very sensitive to heat.

3. The calibration of the measured scale factors in the separate scanning and printing apparatus vary and therefore rarely coincide over extended time periods.

4. Errors in transferring the exposure factors from the light measuring unit to the printing apparatus are practically unavoidable.

SUMMARY OF THE INVENTION

In accordance with this invention the aforementioned disadvantages are avoided by viewing the transparency inserted in the holder of the printing apparatus as it is illuminated by the printing light beam by a closed circuit television camera and monitor. The color quantities in the image viewed in the monitor screen are adjusted to determine the color light quantities to be used in the printing exposure. The sensitivity of the television system being previously coordinated with that of the three emulsion layers in the printing paper.

This provides the advantage of allowing the television system to remain at the same sensitivity setting for all successive printings with the same type of printing type emulsion and thus provide convenience and uniformity. In addition, inherent instabilities in the light beam between the source and transparency are insignificant because measuring and printing follow immediately after each other. Errors in transfer of the measuring factors are also excluded because the adjusting controls for the color light components and intensity are adjusted only during the color measurement and need not be touched at all during printing.

Another characteristic of this invention is the employment of a television system operating according to the sequential processs in which half images in the basic three color components are transmitted sequentially over one and the same transmitting channel, therefore assuring an extremely uniform color balance. Such a system provides results about as good as high quality color television receiver, which is comparable to the quality of conventional color printing apparatus.

The color television and monitoring system of this invention may include a projection system having a lens which projects the ultimate viewed image onto a ground glass viewing plate. The rotary color filters required for the sequential process may be arranged in the proximity of the projection lens and thus have small dimensions. The corrective filters for the basic coordination of the sensitivity of the system with that of the printing paper may also be inserted in this small cross-sectional portion of the light beam and thus also may be relatively small.

A second viewing plate may also be arranged close to the first for projecting a distortion-free test transparency to provide a convenient standard against which to compare the transparency to be printed. This avoids errors of judgment and measurement from occuring as a result of eye fatigue over extended periods of printing.

BRIEF DESCRIPTION OF THE DRAWINGS

Novel features and advantages of the present invention will become apparent to one skilled in the art from a reading of the following description in conjunction with the accompanying drawing wherein similar reference characters refer to similar parts and in which.

DESCRIPTION OF THE PREFERRED EMBODIMENTS

Figure 1:
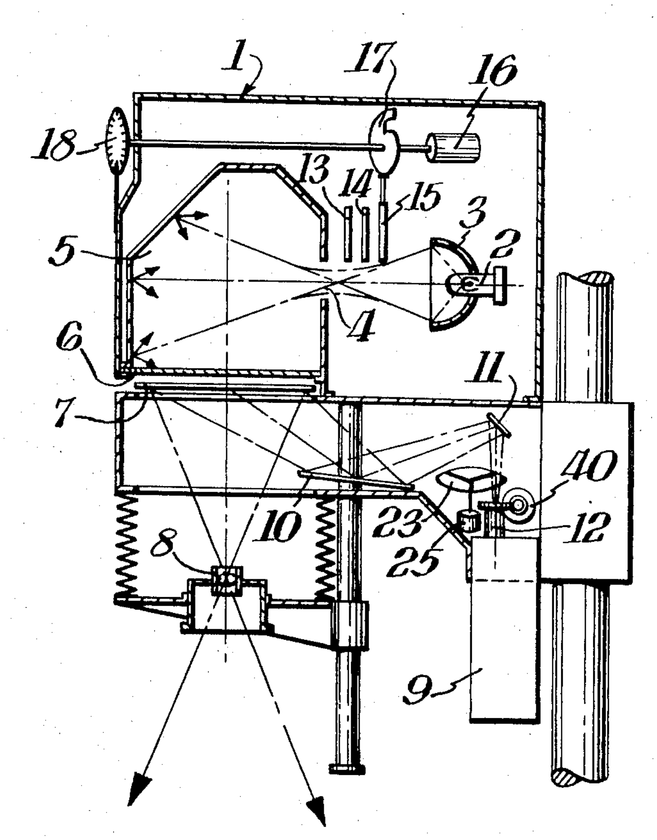
FIG. 1 is a schematic cross-sectional side view in elevation of the light projecting and television camera scanning portion of one embodiment of this invention in conjunction with a photographic printing apparatus.

In FIG. 1 is shown a projecting portion of a photographic printing apparatus having a hood 1 within which is mounted light projecting lamp 2 within ellipsoid reflector 3. The white light beam emitted from projection lamp 2 passes through aperture 4 into mixing chamber 5 from which it diffusely emerges to pass through opal disk 6 and transparency or negative 7 being measured and printed. Negative 7 is projected in a known manner by lens 8 onto the printing plane, not illustrated in the drawing. For the determination of the color printing light quantities, negative 7 is also viewed by black-and-white television camera 9 through deflecting mirrors 10 and 11. Lens 12, preferably has a continuously variable focal length to make camera 9 independent of the negative and to permit particularly important portions of the negative to be viewed more precisely.

For the purpose of adjusting the three basic light components of the light beam emitted from the projection lamp 2, three light filters 13, 14 and 15 in the colors yellow, purple and blue-green (otherwise referred to as yellow, magenta and cyan) are variably inserted into the bath of beam in front of aperture 4 into mixing chamber 5, thus resulting in a reduction of the three basic light intensities. The light colored by the partially inserted filters is uniformly dispersed in chamber 5.

The insertion of ilters into the path of the light beam is accomplished, as shown in the drawing for filter 15, by means of electric motor 16 and cam plate 17. Filters 13 and 14 are similarly actuated by similar motors and cams, which are not illustrated. The filter settings are read from calibrated dial 18 and two similar dials, which are not shown, to guide further printing operations.

The picture viewed by television camera 9 is positively reproduced on picture screen 19 of black-and-white television monitor 20 (FIG. 2) and projected on ground glass viewing plate 22 by lens 21. Color information is transmitted by two filter wheels 23 and 24 rotating in the path of the light beams in front of camera 9 and lens 21. Filter wheels 23 and 24 include three sector-shaped filters in the three basic colors: blue, green and red. They are synchronized with the picture frequency in such a manner that the passage time of one filter through the beam corresponds exactly to the duration of one-half image. Motors 25 and 26 rotate filter wheels 23 and 24. To balance the sensitivity of the television system to that of the color printing paper, corresponding complementary filters are inserted into filter holder 27.

A standard test transparency 30 is projected by lens 29 onto ground glass viewing plate 28. The projected image serves as a comparison or standard for balancing the particular transparency or negative being printed. The stnadard projecting light source is projection lamp 31 in conjunction with reflector 32 and condensers 33 and 34. Color filters may be inserted into the filter holder 35 to equalize to a colorless gray the image projected on viewing plate 28.

Figure 2:
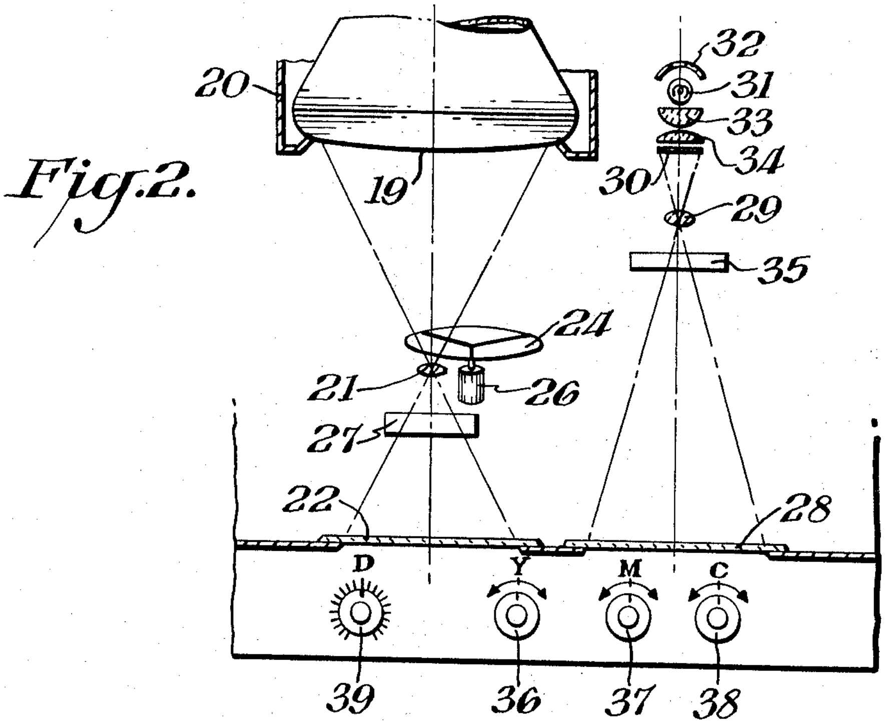
FIG. 2 is a schematic cross-sectional view in elevation of the television monitoring portion of the device shown in FIG. 1.

The balancing and color measurement of a negative is accomplished by turning control knobs 36, 37, 38, on the control console shown in FIG. 2 which control filter insertion motor 16 in the projection head and the non-illustrated motors for the other two filters to adjust the color balance. The letters Y, M and C on knobs 36, 37 and 38 on the control console correspond to the filter colors of yellow, magenta and cyan—otherwise referred to as yellow, purple and blue-green. Density control knob 39 is provided for equalizing the brightness of the image being measured with the standard test image and it actuates follow-up motor 40, which in turn adjusts the diaphragm or aperture of camera lens 12. The filter setting is read and noted on calibrated scale 18 and on other scales not illustrated for the two other filters for later repetition of copies. The scale of density control knob 39 is calibrated in the illumination factors utilized in the calculation of the exposure time.

I claim:

1. A device for determining the amounts of color light components for the printing of a photographic color transparency in a photographic printing apparatus in which said transparency is exposed to printing light comprising a closed circuit television camera and monitor system whereby said television camera scans said transparency while it is illuminated by said printing light, color component varying means connected to said printing apparatus for varying the amounts of color components in said printing light in a continuous manner, said monitor providing an image of said illuminated transparency whereby said color component varying means may be adjusted to provide a satisfactory color component balance, a standard projecting system having a holder for a standard transparency having a desirable color balance, and a viewing plate being mounted on said printing apparatus with said viewing plate disposed adjacent said monitor to provide a convenient means for comparing the color components in said monitor with a desirable color balance standard.

2. A device as set form in claim 1 wherein said closed circuit television camera and monitor system includes output image projecting means and said color component varying means is connected to said output image projecting means for coordinating the sensitivity of said television camera and monitor system with that of the color photographic printing paper being utilized with said apparatus.

3. A device as set forth in claim 2 wherein said color component varying means comprises color filter inserting means.

4. A device as set forth in claim 1 wherein a standard projecting light varying means is disposed in said projecting system of said standard system for equalizing the standard image to a neutral gray.

5. A device as set forth in claim 1 wherein said printing light varying means comprises a plurality of colored light filters, continuously variable inserting means being connected to said filters for inserting them selectable amounts into said printing light, and a color light component mixer disposed between said colored light filters and said transparency.

6. A device as set forth in claim 5 wherein camera beam deflecting means directs said camera beam unto said illuminated transparency, and said light deflecting means comprising a pair of flat mirrors connected between said television camera and said transparency.

7. A device as set forth in claim 1 wherein a diaphragm is connected to said television camera for adjusting its aperture and the intensity of the image displayed upon said monitor, and calibrated control means being connected to said diaphragm whereby the intensity and duration of illumination of said printing light is determined.

8. A device as set forth in claim 1 wherein said television camera and monitor system is of the field sequential type having a single transmission channel whereby the transmission of signals corresponding to each of the three color components over said single transmission channel helps maintain uniformity of color balance.

9. A device as set forth in claim 8 wherein said monitor includes a projection system having a lens and moving colored light filters for the field sequential process, and said moving filters being mounted adjacent said lens in the path of said printing light.

10. A device as set forth in claim 9 wherein said television camera also includes another projection system having another lens and additional moving colored light filters for the field sequential process, and said additional moving colored light filters being mounted adjacent said another lens in the field of view of said television camera.

* * * * *